(12) United States Patent
Rasbornig et al.

(10) Patent No.: US 10,180,444 B2
(45) Date of Patent: Jan. 15, 2019

(54) SLOW SPEED SIGNAL DETECTION FOR ABS SENSORS WITH ADAPTIVE TIME WATCHDOG CONCEPT FOR 0HZ CAPABILITY

(71) Applicant: Infineon Technologies AG, Neubiberg (DE)

(72) Inventors: Friedrich Rasbornig, Klagenfurt (AT); Bernhard Schaffer, Villach (AT); Christoph Schroers, Villach (AT)

(73) Assignee: Infineon Technologies AG, Neubiberg (DE)

( * ) Notice: Subject to any disclaimer, the term of this patent is extended or adjusted under 35 U.S.C. 154(b) by 553 days.

(21) Appl. No.: 14/744,374

(22) Filed: Jun. 19, 2015

(65) Prior Publication Data

US 2015/0370249 A1  Dec. 24, 2015

(30) Foreign Application Priority Data

Jun. 20, 2014 (CN) .................... 2014 2 0331560 U

(51) Int. Cl.
G05B 21/02 (2006.01)
G01P 3/489 (2006.01)
G01D 5/14 (2006.01)
G01D 5/244 (2006.01)

(52) U.S. Cl.
CPC ............. *G01P 3/489* (2013.01); *G01D 5/145* (2013.01); *G01D 5/2448* (2013.01); *G01D 5/2449* (2013.01)

(58) Field of Classification Search
CPC ...... G01P 3/489; G01D 5/2448; G01D 5/145; G01D 5/2449
See application file for complete search history.

(56) References Cited

U.S. PATENT DOCUMENTS

| | | | |
|---|---|---|---|
| 4,873,474 | A | 10/1989 | Johnson |
| 6,738,246 | B1 | 5/2004 | Struempler |
| 2004/0196605 | A1 | 10/2004 | Dinn et al. |

(Continued)

FOREIGN PATENT DOCUMENTS

| | | |
|---|---|---|
| CN | 101448417 A | 6/2009 |
| CN | 201385577 Y | 1/2010 |
| CN | 203135836 U | 8/2013 |

*Primary Examiner* — Gregory J Toatley
*Assistant Examiner* — L. Anderson
(74) *Attorney, Agent, or Firm* — Eschweiler & Potashnik, LLC

(57) ABSTRACT

The present disclosure relates to a rotation speed sensor, including at least one sensor element to detect a magnetic input signal of the rotation speed sensor, a time watchdog with a programmable time constant and an output control circuit. The time watchdog generates a time-out event when no minimum or maximum or no output switching event of a magnetic input signal of the rotation speed sensor is detected within a time-interval equal to a programmed time constant of the time watchdog. Further, the output control circuit changes the output signal of the rotation speed sensor from a first value to a second value, when a minimum or a maximum or output switching event of the magnetic input signal is detected within the time interval and a change of the magnetic input signal is greater than a predetermined value.

11 Claims, 2 Drawing Sheets

(56) References Cited

U.S. PATENT DOCUMENTS

| | | | |
|---|---|---|---|
| 2012/0249126 A1* | 10/2012 | Friedrich | G01D 5/2448 324/207.13 |
| 2014/0266176 A1* | 9/2014 | Fernandez | G01R 1/44 324/244 |

* cited by examiner

SLOW SPEED SIGNAL DETECTION FOR ABS SENSORS WITH ADAPTIVE TIME WATCHDOG CONCEPT FOR 0HZ CAPABILITY

CROSS-REFERENCE TO RELATED APPLICATIONS

This application claims priority to Chinese Application no. 201420331560.0, filed on Jun. 20, 2014, and incorporated herein by reference in its entirety.

FIELD

The present disclosure relates to a rotation speed sensor.

BACKGROUND

With respect to the rotation speed sensor based on the Hall technology or the xMR technology, currently there are customer requirements for large magnetic air gap and corresponding duty ratio (40-60%—ratio between $T_{on}$ and $T_{off}$ of output signals of e. g. 7 mA/14 mA) as well as additional low output jitter application requirement for indirect tire pressure monitoring functionality (iTMPF). In addition, there is also another application requirement, i.e. realizing the so-called capability of 0 Hz (such as for the Hill-holder functionality).

However, there is so far no rotation speed sensor that can meet the above-mentioned three requirements simultaneously at reasonable costs in one sensor product.

SUMMARY

Therefore, the present disclosure is based on providing a rotation speed sensor which can overcome the above-mentioned deficit of the prior art, i.e. meet the above-mentioned three customer and application requirements at reasonable costs simultaneously.

According to the present utility mode, a rotation speed sensor is provided, comprising at least one sensor element for detecting a magnetic input signal of the rotation speed sensor, a time watchdog with a programmable time constant and an output control circuit. The time watchdog generates a time-out event when no minimum or no maximum, or no output switching event of a magnetic input signal of the rotation speed sensor is detected within a time-interval equal to a programmed time constant of the time watchdog, and the output control circuit changes the output signal of the rotation speed sensor from a first value to a second value, when a minimum or a maximum or an output switching event of the magnetic input signal is detected within the time interval and a change of the magnetic input signal is greater than a predetermined value.

According to one embodiment of the present disclosure, the rotation speed sensor further comprises an analog signal processing block which comprises an analog signal conditioning block and an analog comparator. The magnetic input signal detected by the at least one sensor element is input to the analog signal conditioning block and is transmitted to the digital signal processing device and the time watchdog via an analog-to-digital converter.

According to one embodiment of the present disclosure, the output control circuit determines a change of the magnetic input signal based on a value of the magnetic input signal at the last time-out event of the time watchdog.

According to one embodiment of the present disclosure, the programmed time constant of the time watchdog is reprogrammed to a new time constant, when the time watchdog generates a time-out event. In one embodiment the new time constant is for instance two or four times etc. the programmed time constant of the time watchdog.

According to one embodiment of the present disclosure, the time constant of the time watchdog is reset to the programmed time constant, when a minimum or a maximum or an output switching event of the magnetic input signal is detected within the time interval and a change of the magnetic input signal is greater than a predetermined value.

In one embodiment the at least one sensor element is an xMR sensor (e. g. Anisotropic Magneto Resistance sensor or a Giant Magneto Resistance sensor or a Tunnel Magneto Resistance sensor) or a Hall sensor.

According to one embodiment of the present disclosure, the output control circuit comprises an asynchronous logic circuit for receiving the output from the analog comparator and performing unclocked signal processing so as to avoid quantized noises.

For instance, the rotation speed sensor further comprises a digital offset control means, an output of which is fed back to the analog signal processing block through an offset compensation digital-to-analog converter.

For instance, the analog signal conditioning block includes an amplifier and a low-pass filter connected in series.

In one embodiment of this disclosure enables the necessary adaption of the time constant of the time watchdog for very slow wheel speed of a vehicle and slow output signal of the rotation speed sensor corresponding thereto.

With this idea, a so-called 0 Hz capability can be implemented based on existing rotation speed sensors and customary behaviors according to the specification can be obtained especially under typical application conditions as compared with the existing rotation speed sensors. Using this solution, it may also be ensured that typical Anti-lock Braking System ABS behavior of a corresponding sensor can be obtained or remain compatible such that with respect to a standard application, for example, no adaption within an Electronic Control Unit ECU (Software-Adaption) is necessary. This may give the incentive to utilize this functionality (0 Hz functionality) with relatively low additional circuit- and digital algorithm costs from the viewpoint of a customer.

Another advantage according to one embodiment of the disclosure is that in the case of very slow signals, even when there are large offset jumps (for example caused by sensor elements and/or the electronical evaluation circuit) or wheel stand still, the digital state machine is reset and output switching is obtained by the time watchdog, thereby resulting in no pulse loss, i.e. enabling Hill-Holder functionality.

BRIEF DESCRIPTION OF THE DRAWINGS

These and other features and advantages of the present disclosure will be apparent from the following detailed description with reference to the accompanying drawing, in which.

DETAILED DESCRIPTION

Embodiments of the present disclosure now will be described more fully hereinafter with reference to the accompanying drawings, in which a block diagram of the principle of the present disclosure is shown. The present disclosure may, however, be embodied in many different forms and should not be construed as limited to the embodiments set forth herein.

The terminology used herein is for the purpose of describing particular embodiments only and is not intended to limit the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, elements, and/or components, but do not preclude the presence or addition of one or more other features, integers, elements, components, and/or groups thereof.

Unless otherwise defined, all terms (including technical and scientific terms) used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
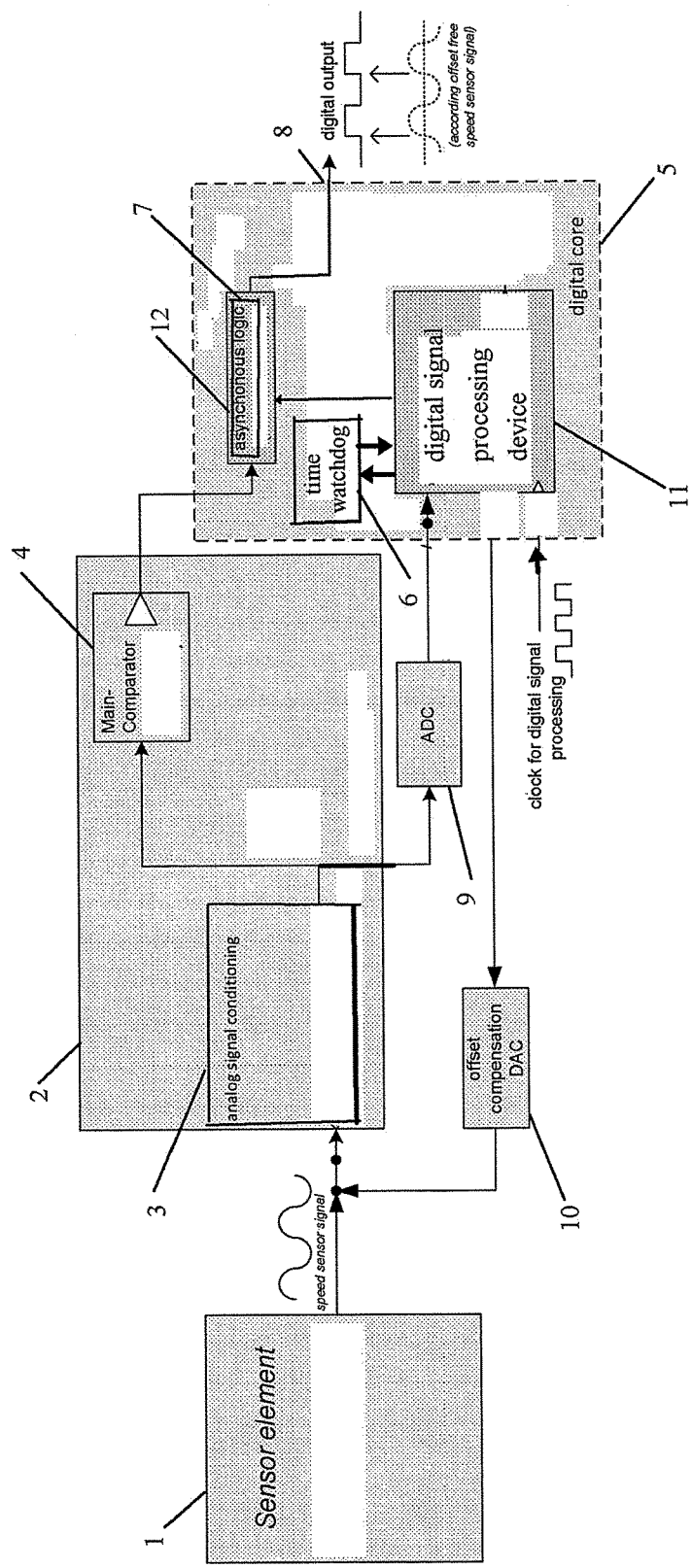
FIG. 1 is a schematic block diagram of the principle of the rotation speed sensor according to one embodiment of the present disclosure, and FIG. 2 schematically shows an example for the behavior of the time watchdog in the rotation speed sensor according to one embodiment of the present disclosure.

FIG. 1 schematically shows a block diagram of the principle of the rotation speed sensor according to the present disclosure. The rotation speed sensor comprises at least one sensor element 1 for detecting a magnetic input signal of the rotation speed sensor, an analog signal processing block 2, a digital core 5 for processing digital signals and a digital output 8, wherein the analog signal processing block 2 can comprise, for example, an analog signal conditioning block 3 and a main comparator 4, which can be, for example, a time-continuous analog comparator.

The at least one sensor element 1 can be, for example, an Anisotropic Magneto Resistance (AMR)/Giant Magneto Resistance (GMR)/Tunnel Magneto Resistance (TMR) sensor or a Hall sensor.

In one embodiment of the present disclosure, the analog signal conditioning block 3 may include an amplifier and a low-pass filter connected in series (not shown).

In one embodiment the digital core 5 comprises a digital signal processing device 11, a output control unit 12 and a time watchdog 6 with a predetermined time constant, which can be predetermined in a programmed manner. According to one embodiment of the present disclosure, in addition to being transmitted to the main comparator 4, the output of the analog signal conditioning block 3 is digitized by an analog-to-digital converter 9 and then transmitted to the digital signal processing device 11 so as to be further processed and to search for the minimum and maximum of the magnetic input signal.

If no minimum or maximum or no output switching of the magnetic input signal of the rotation speed sensor is detected within a time-interval equal to a predetermined time constant of the time watchdog 6, for example, 700 ms, the time watchdog 6 generates a time-out event. According to one embodiment of the present disclosure, the programmed time constant of the time watchdog 6 is reprogrammed to a new time constant when the time watchdog 6 generates a time-out event. For example, the new time constant is two or four times etc. the predetermined time constant of the time watchdog 6. According to one embodiment of the present disclosure, the output control unit 12 determines a change of the magnetic input signal based on a value of the magnetic input signal at the last time-out event of the time watchdog 6.

When a minimum or a maximum or a output switching of the magnetic input signal is detected within the time interval equal to a predetermined time constant of the time watchdog 6, for example, 700 ms and a change of the magnetic input signal is smaller than a predetermined value, the output control unit 12 changes the output signal of the rotation speed sensor from a first value to a second value, i.e. switches the output of the rotation speed sensor. In one embodiment the time constant of the time watchdog 6 is reset to the programmed time constant.

In one embodiment the output control unit 12 comprises an asynchronous logic circuit 7 for performing un-clocked signal processing so as to avoid quantized noises. The output of the asynchronous logic circuit 7 is connected to the digital output 8, which is an asynchronous output in this case.

According to one embodiment of the present disclosure, the digital core 5 may, for example, comprise a digital offset controller (not shown), the output of which is fed back to the analog signal processing block 2 through an offset compensation digital-to-analog converter 10, so that output signals according to the offset-free speed signals can be provided on the digital output 8.

Figure 2:
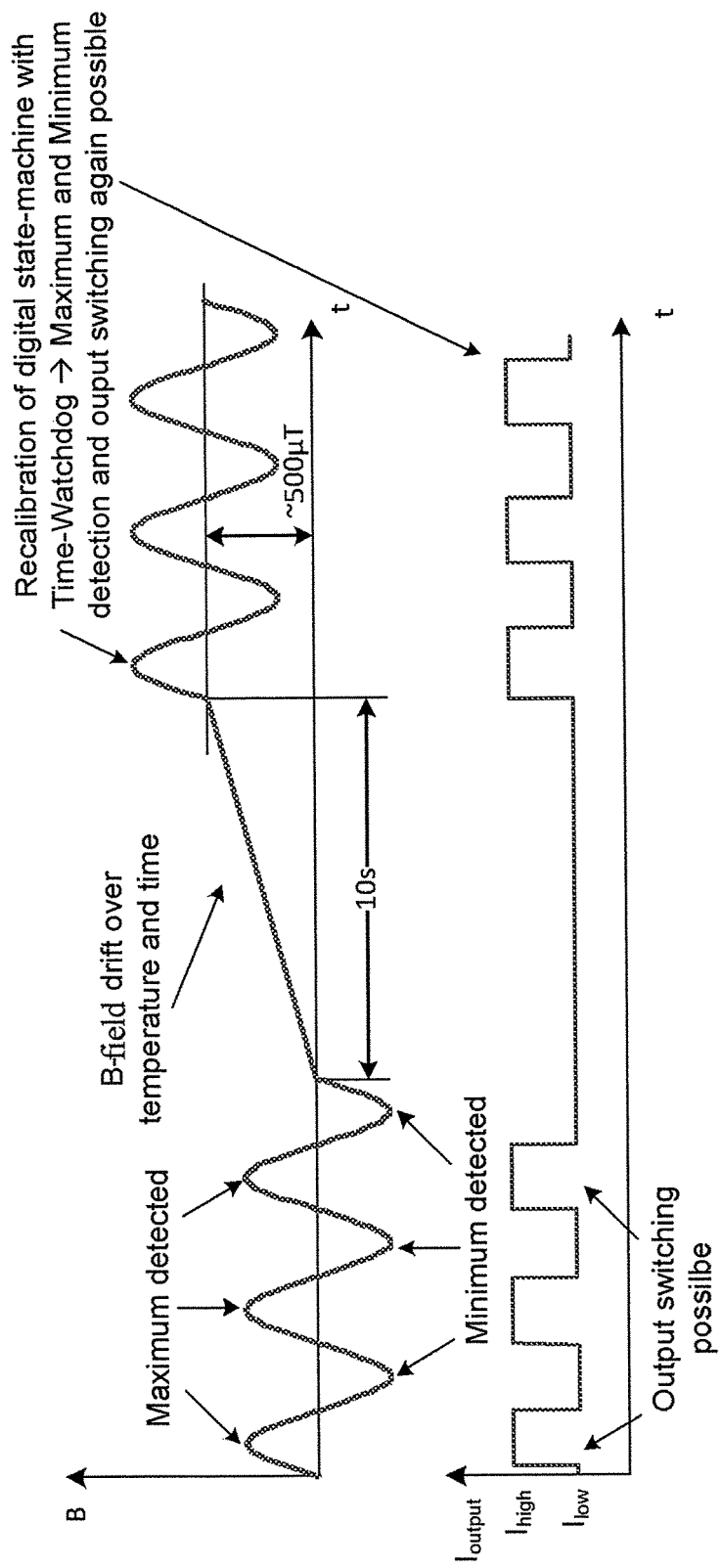

FIG. 2 schematically shows an example for the behavior of the time watchdog in the rotation speed sensor according to one embodiment of the present disclosure. A magnetic input signal in the case of wheel-standstill and a magnetic input signal in the case of B field drift over temperature and time are shown in the above graph in FIG. 2. It is possible to detect maximum and minimum of the magnetic input signal again when the digital state machine is recalibrated with the time watchdog according to the present disclosure. In the under graph in FIG. 2, the output signal of the rotation speed sensor is shown. It is possible to carry out output switching again when the digital state machine is recalibrated with the time watchdog according to the present disclosure.

According to the present disclosure, by means of maximum and minimum of the magnetic input signal, not only the current magnetic field magnitude needed for the "hidden" hysteresis function can be determined, but also the input signal offset can be determined. The offset is caused, on the one hand, by an external magnetic field (e.g. pole wheel or gear wheel) and/or the electrical offset of the analog signal processing block. By means of information of the offset, the switching signal can be centered again using the offset compensation digital-to-analog converter so as to obtain the desired duty ratio of 50% or to prevent that signal loss and thus output switching loss might be caused by the offset-drift incurred by the temperature jumps.

While the present disclosure and advantages thereof have been described in details by way of the exemplary embodiments, those skilled in the art shall understand that many substitutions and variations may be made to the present disclosure without departing from the spirit and scope of the present disclosure defined by the appended claims.

What is claimed is:

1. A rotation speed sensor, comprising:
    at least one sensor element configured to detect a magnetic field and generate a magnetic input signal of the rotation speed sensor based thereon,
    a time watchdog device with a programmable time constant, and an output control circuit,
wherein the time watchdog device is configured to generate a time-out event when no minimum or maximum or no output switching event of a magnetic input signal of the rotation speed sensor is detected within a time interval equal to a programmed time constant of the time watchdog device, and
wherein the output control circuit is configured to change an output signal of the rotation speed sensor from a first value to a second value, when a minimum or a maximum or an output switching event of the magnetic input signal is detected within the time interval, and thus a time-out event is not generated by the time watchdog device, and a change of the magnetic input signal is greater than a predetermined value.

2. The rotation speed sensor according to claim 1, wherein the rotation speed sensor further comprises an analog signal processing block which comprises an analog signal conditioning block and an analog comparator, wherein the magnetic input signal generated by the at least one sensor element is input to the analog signal conditioning block and is transmitted to the time watchdog device as a conditioned, digitized magnetic input signal via an analog-to-digital converter.

3. The rotation speed sensor according to claim 2, wherein the output control circuit comprises an asynchronous logic circuit configured to receive an output from the analog comparator and perform un-clocked signal processing so as to avoid quantized noises.

4. The rotation speed sensor according to claim 2, wherein the analog signal conditioning block includes an amplifier and a low-pass filter connected in series.

5. The rotation speed sensor according to claim 1, wherein the output control circuit determines a change of the magnetic input signal based on a value of the magnetic input signal at a last time-out event of the time watchdog device.

6. The rotation speed sensor according to claim 1, wherein the programmed time constant of the time watchdog device is reprogrammed to a new time constant, when the time watchdog device generates a time-out event.

7. The rotation speed sensor according to claim 6, wherein the new time constant is two or four times the programmed time constant of the time watchdog device.

8. The rotation speed sensor according to claim 1, wherein the time constant of the time watchdog device is reset to the programmed time constant, when a minimum or a maximum or an output switching event of the magnetic input signal is detected within the time interval and a change of the magnetic input signal is smaller than the predetermined value.

9. The rotation speed sensor according to claim 1, wherein the at least one sensor element is a xMR sensor or a Hall sensor.

10. The rotation speed sensor according to claim 9, wherein the xMR sensor is an Anisotropic Magneto Resistance sensor or a Giant Magneto Resistance sensor or a Tunnel Magneto Resistance sensor.

11. The rotation speed sensor according to claim 2, wherein the rotation speed sensor further comprises a digital offset control circuit, an output of which is fed back to the analog signal processing block through an offset compensation digital-to-analog converter.

* * * * *